United States Patent [19]
Chitayat

[11] Patent Number: 5,783,877
[45] Date of Patent: Jul. 21, 1998

[54] LINEAR MOTOR WITH IMPROVED COOLING

[75] Inventor: Anwar Chitayat, Fort Salanga, N.Y.

[73] Assignee: Anorad Corporation, Hauppauge, N.Y.

[21] Appl. No.: 631,343

[22] Filed: Apr. 12, 1996

[51] Int. Cl.[6] .............. H02K 9/00; H02K 9/19; H02K 9/22
[52] U.S. Cl. .................. 310/12; 310/52; 310/54; 310/64
[58] Field of Search ............................ 310/12, 13, 14, 310/52, 54, 58, 59, 60 R, 64, 16

[56] References Cited

U.S. PATENT DOCUMENTS

| | | | |
|---|---|---|---|
| 3,806,782 | 4/1974 | Matsui et al. | 310/13 |
| 3,913,045 | 10/1975 | Von Starck | 310/13 |
| 4,172,229 | 10/1979 | Guimbal | 310/13 |
| 4,625,132 | 11/1986 | Chitayat | 310/13 |
| 4,839,545 | 6/1989 | Chitayat | 310/12 |
| 4,906,878 | 3/1990 | Twaalfhoven et al. | 310/12 |
| 5,072,146 | 12/1991 | New | 310/90.5 |
| 5,086,729 | 2/1992 | Katagiri | 318/135 |

FOREIGN PATENT DOCUMENTS

| | | | |
|---|---|---|---|
| 1-194847 | 1/1988 | Japan | 310/54 |
| 1-315249 | 12/1989 | Japan | 310/54 |
| 2-237459 | 9/1990 | Japan | 310/12 |
| 8-317627 | 11/1995 | Japan | H02K 41/035 |
| 8-140329 | 5/1996 | Japan | H02K 41/02 |
| 8-168233 | 6/1996 | Japan | H02K 41/03 |
| 90-12769 | 11/1990 | WIPO | 310/64 |

*Primary Examiner*—Steven L. Stephan
*Assistant Examiner*—B. Mullins
*Attorney, Agent, or Firm*—Morrison Law Firm

[57] ABSTRACT

A linear motor has an epoxy core armature with dual cold plates attached to a top and a bottom of the epoxy core armature to effect cooling of the epoxy core armature. The use of dual cold plates with circulating cooling fluid reduces heat build up by providing paths of high thermal conductivity from any point in the epoxy core armature to the cold plates. Another embodiment of the invention employs ceramic heat sink plates laminated to sides of the epoxy core armature to increase the thermal conductivity and the resultant power dissipation capacity of the epoxy core armature without introducing magnetic or electrically conducting materials. Other embodiments of the invention utilize cold plates formed from extrusions of aluminum or ceramic materials. Still other embodiments have forced air cooling wherein a U-frame of the linear motor has longitudinal flexible seals and air is forced through the U-frame in which the epoxy core armature travel. Yet another embodiment has a U-frame with ducts formed therein through which air is force. Orifices connect the ducts to an interior of the U-frame through which the epoxy core armature travels.

21 Claims, 9 Drawing Sheets

LINEAR MOTOR WITH IMPROVED COOLING

BACKGROUND OF THE INVENTION

The present invention relates to a linear motor with improved cooling and, more particularly, to a linear motor having cold plates on both the top and bottom of a non-magnetic armature employing ceramic materials for improved heat conduction.

Linear motors having cold plates mounted on one edge of an armature are known in the art. Also known are armatures having cooling coils or channel therein. Examples of such armatures are disclosed in U.S. Pat. No. 4,839,545. These armatures are comprised of laminates of magnetic materials.

Linear motors having non-magnetic armatures are also known, an example of which is disclosed in U.S. Pat. No. 4,749,921. The linear motor of the referenced disclosure has a non-magnetic armature which includes a coil support structure composed of an aluminum frame or a serpentine cooling coil. In the embodiment having an aluminum frame, heat is carried away from coils of the armature via the aluminum frame and a side plate affixed to a first edge of the armature. Such an arrangement has a disadvantage in that heat builds up at a second edge of the armature furthest from the side plate which functions as a heat sink. Alternatively, the serpentine coil may be employed to effect more uniform cooling. The serpentine coil supports the overlapping coils while the coils and the armature are cast in a block of settable resin. However, the incorporation of such a coil has the disadvantage of increasing costs because of the complexity of assembly and material expenses. Furthermore, while the use of the settable resin prevents the occurrence of eddy currents, the thermal conductivity of the settable resin is significantly less than that of metals which it replaces and thus reduces the power dissipation capacity of the linear motor.

Linear motors are increasingly being employed in manufacturing equipment. In such equipment, nominal increases in the speed of operation translate into significant savings in the cost of production. Therefore, it is particularly desirable to produce as much force and acceleration as possible in a given linear motor. An increase in force generated requires either an increase in magnetic field intensity or an increase in current applied to coils of the armature. Power dissipated in the coils increases at a rate equal the square of the current. Attendant heat generation severely limits the acceleration that may be achieved because of a danger of coil-overheating. Therefore, improvements in the power dissipation capacity of linear motors provide for increases in their utility.

OBJECTS AND SUMMARY OF THE INVENTION

Accordingly, it is an object of the invention to provide a linear motor with improved cooling which overcomes the drawbacks of the prior art.

It is a further object of the present invention to provide a linear motor having a non-magnetic epoxy core armature with improved cooling with is simple and cost effective to produce.

It is a still further object of the invention to provide a linear motor with an epoxy core armature having first and second cold plates at a top and a bottom thereof to effectively sink heat throughout the armature.

It is yet another of the invention to provide a linear motor with a non-magnetic armature incorporating laminated ceramic plates functioning in conjunction with cold plates to effectively cool the entire armature.

Another object of the invention is to provide a linear motor with a nonmagnetic armature having a ceramic substrate, for effecting heat transfer, which at least partially conforms to a shape of coils in the armature.

Still another object of the invention is to provide an armature having cold plates formed from an extrusion.

A further object of the present invention provides a linear motor having a U-frame with ducts and orifices for directing cooling air upon an armature traveling therein.

Yet another embodiment of the invention provides a linear motor having a U-frame with seals along an open longitudinal side and adapters at ends of the U-frame for introducing and exhausting cooling air.

Briefly stated, there is provided a linear motor having an epoxy core armature with dual cold plates attached to a top and a bottom of the epoxy core armature to effect improved cooling of the epoxy core armature. The use of dual cold plates with circulating cooling fluid reduces heat build up by providing paths of high thermal conductivity from any point in the epoxy core armature to the cold plates. Another embodiment of the invention employs ceramic heat sink plates laminated to sides of the epoxy core armature to increase the thermal conductivity and the resultant power dissipation capacity of the epoxy core armature without introducing magnetic or electrically conducting materials. Other embodiments of the invention utilize cold plates formed from extrusions of aluminum or ceramic materials. Still other embodiments have forced air cooling wherein a U-frame of the linear motor has longitudinal flexible seals and air is forced through the U-frame in which the epoxy core armature travel. Yet another embodiment has a U-frame with ducts formed therein through which air is force. Orifices connect the ducts to an interior of the U-frame through which the epoxy core armature travels.

In accordance with these and other objects of the invention, there is provided a linear motor comprising: a magnet plate having a plurality of magnets of alternating polarity affixed thereto, an armature block having at least one coil encapsulated in a settable resin, the armature block containing substantially no magnetic material, a first cold plate affixed to a bottom portion of the armature block, a second cold plate affixed to a top portion of the armature block, and means for allowing supply of a cooling liquid to the first and the second cold plates such that heat dissipated by the at least one coil in the armature block is removed by the cooling liquid.

According to feature of the invention, there is further provided a linear motor comprising: a magnet plate having a plurality of magnets of alternating polarity affixed thereto, an armature block having at least one coil and a ceramic substrate heat sink, the at least one coil having a center aperture, the ceramic substrate heat sink having a plate surface and a protrusion extending from the plate surface and into the center aperture of the at least one coil positioned upon the plate surface, the at least one coil and the ceramic substrate heat sink being encapsulated in a settable resin, the armature block containing substantially no magnetic material, heat sink means for sinking heat carried by the ceramic substrate heat sink from the at least one coil.

According to a still further feature of the invention, there is still further provided a linear motor comprising: a magnet plate having a plurality of magnets of alternating polarity affixed thereto, an armature block having at least one coil and a ceramic substrate heat sink, the ceramic substrate heat sink having a recess for accepting the at least one coil, the at least one coil and the ceramic substrate heat sink being encapsulated in a settable resin, the armature block containing substantially no magnetic material, heat sink means for sinking heat carried by the ceramic substrate heat sink from the at least one coil.

According to yet another feature of the invention, there is provided a linear motor comprising: a U-frame having opposing inner walls, joined by a bridge portion at a closed end, defining a longitudinal cavity, the opposing inner walls having a plurality of magnets of alternating polarity affixed thereto, an armature block having at least one coil encapsulated in a settable resin and traveling within the U-frame, the armature block containing substantially no magnetic material, the U-frame having a duct extending throughout a longitudinal length thereof, the duct having orifices connecting the duct with the longitudinal cavity, the duct and the orifices permitting cooling air to be introduced into the longitudinal cavity such that heat generated in the armature block is removed by the cooling air.

According to still another feature of the invention there is provided a linear motor comprising: a U-frame having opposing inner walls, joined by a bridge portion at a closed side, defining a longitudinal cavity and a cavity aperture at an open side, the opposing inner walls having a plurality of magnets of alternating polarity affixed thereto, an armature block having at least one coil encapsulated in a settable resin and traveling within the U-frame, the armature block containing substantially no magnetic material, the U-frame having an input adaptor at a first end for introducing cooling air into the longitudinal cavity, the U-frame having seals extending along the longitudinal cavity aperture on opposing sides thereof, the seals engaging each other so as to close the cavity aperture, the armature block extending out of the longitudinal cavity displacing the seals, the cooling air flowing in the longitudinal cavity such that heat generated in the armature block is removed by the cooling air which exhausts from an open second end of the U-frame.

According to still another embodiment of the present invention, there is provided, a linear motor, comprising: a base, an armature element attached to the base, a first duct attached to the base suitable for carrying a cooling fluid, a U-frame having magnets attached thereto positioned to interact with magnetic fields of the armature element to produce a motive force and shaped so as to create a space between the U-frame and the armature element, the first duct having first ports communicating with the space near an end of the space toward the base, a second duct attached to the U-frame; the second duct having second ports communicating with the space near an end of the space toward a blind end of the U-frame and the first and second ports being positioned to cause the fluid to pass from one of the first and second ports through the space to the other of the first and second ports, whereby the armature element is cooled by the fluid.

According to still another embodiment of the present invention, there is provided, a method of making a linear motor, comprising the steps of: positioning a frame with permanent magnets adjacent an armature element having electrical coils and a duct in such a way as to form a space between the frame and the armature element, forming a hole passing from one surface of the armature not adjacent the space through the duct and into the space, sealing one end of the hole not in communication with the space so that the duct communicates with the space without leaking from the end, injecting air into the space through the duct, through the hole. The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6b is an end view of the ceramic substrate of FIG. 6a.

FIG. 6c is a cross section bottom view of the embodiment shown in FIG. 6a.

FIG. 7b is a cross section bottom view of the embodiment shown in FIG. 7a.

DETAILED DESCRIPTION OF THE PREFERRED EMBODIMENT

Figure 1:
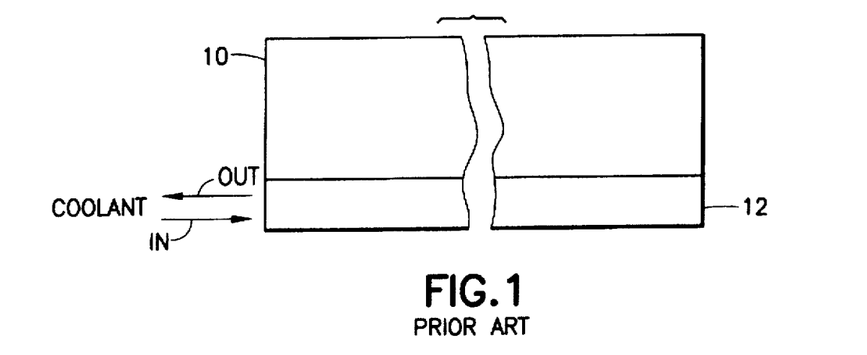
FIG. 1 is a simplified side view of an armature having single cold plate cooling of the prior art.

Referring to FIG. 1, there is shown a side view of an armature assembly of the prior art having a single sided liquid cooling system. An armature 10 is mounted in contact with a cold plate 12. Heat is drawn from the armature 10 into the cold plate 12, however, since the top portion of the armature 10 is furthest from the cold plate 12 it has a path of greater thermal resistance to the cold plate 12 than does a bottom portion of the armature 10 which is closer to the cold plate 12. Therefore, heat is transferred inefficiently from the top of the armature 10. Inefficient heat transfer corresponds to higher equilibrium temperatures for a given power dissipation rate. Because the materials and construction have limited ability to cope with high temperatures, the total power dissipation capacity of the armature assembly is limited by the inefficient heat transfer.

Figure 2A:
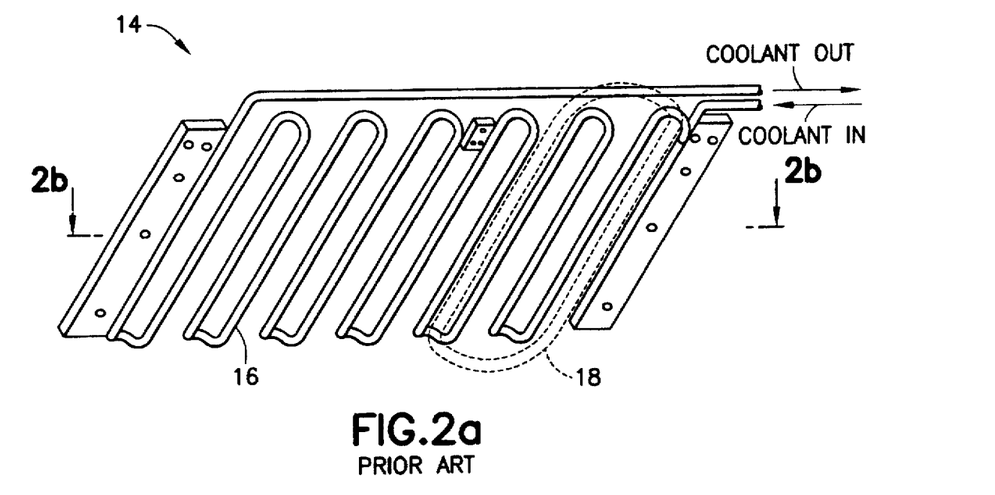
FIG. 2a is a perspective view of a serpentine cooling tube structure of an embodiment of an armature of the prior art.
Figure 2B:
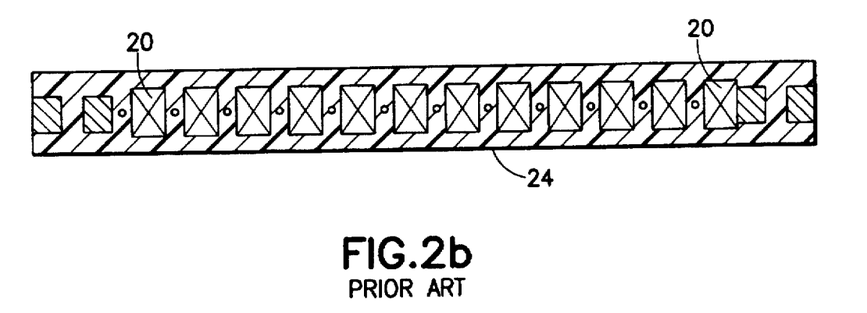
FIG. 2b is a cross section view, after potting, of the armature shown in FIG. 2a taken along line IIb—IIb.

Referring to FIG. 2a, an alternative cooling method, used in a non-magnetic armature of the prior art, incorporates an armature frame 14 composed of a serpentine cooling tube 16. Overlapping coils are laid upon the armature frame 14 as indicated by a dashed coil outline 18. Once each coil has been positioned upon the armature frame 14, the entire assembly is potted in resin. In FIG. 2b a cross section of a potted armature assembly of FIG. 2a is shown. Coils 20 have the serpentine cooling tube 14 positioned between each adjacent coil and a casing 24 of resin provides structural integrity and thermally conductive medium for transferring heat from the coils 20 to the serpentine cooling tube 14. While this construction is effective in eliminating heat from the armature, assembly is complex and the use of overlapping coils adds bulk to the structure.

Figure 3A:
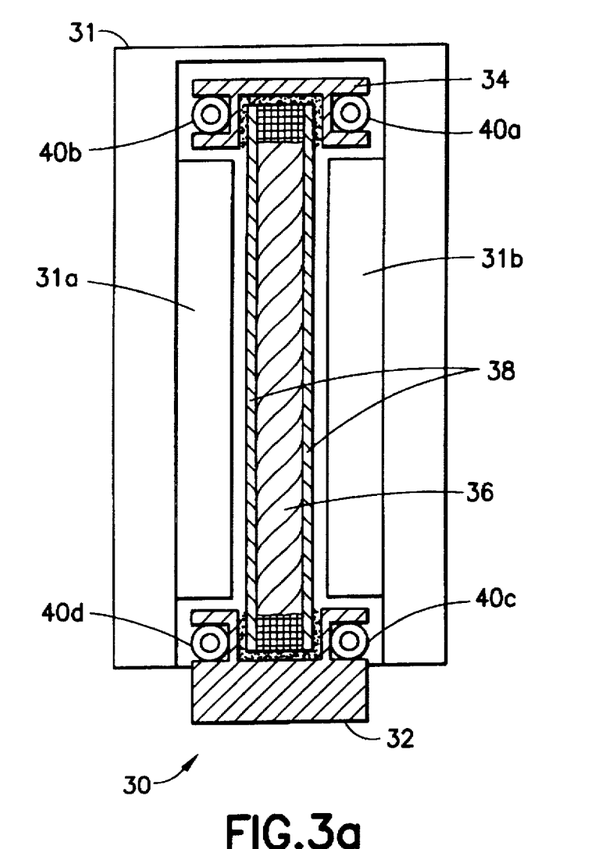
FIG. 3a is a partial cross section end view of a linear motor of the present invention incorporating dual cold plate cooling.

Referring to FIG. 3a, an embodiment of the present invention includes a non-magnetic armature 30 having a base cold plate 32 and a top cold plate 34. The non-magnetic armature 30 travels within a U-frame 31 of a linear motor and is carried and retained by a user-supplied slide means (not shown) adapted to a particular user application. The U-frame 31 supports a first and a second array of magnets of which two magnets, 31a and 31b, are shown. Flat coils, of which a coil 36 is shown, are potted in an armature block 38 formed of a settable resin. The base cold plate 32 and the top cold plate 34 are affixed to a top and a bottom of the armature block 38 by means of the settable resin used to form the armature block 38. The base and top cold plates, 32 and 34, have coolant tubes 40a, 40b, 40c, and 40d, affixed therein. The settable resin is selected so as to provide high thermal conductivity. One such settable resin is an epoxy resin sold by Emerson and Cumming, Inc. of Canton, Mass. under the trademark "STYCAST 2850MT" which has a thermal conductivity of 20 BTU/in./hr/ft²/Deg. F.

The flat coils of the armature block 38 are cooled by means of a liquid coolant passing through the coolant tubes 40a, 40b, 40c, and 40d, in the base and top cold plates, 32 and 34. This configuration allows heat to be removed from a middle portion of the armature block by means of thermal paths to both cold plates, 32 and 34. Thus, the thermal resistance between the portion of the armature block furthest from a cold plate is half that of the single cold plate armature of the prior art. Thus, to a first approximation, the heat sinking capacity is double that of the prior art.

Furthermore, the flat coils are wound using wire of a rectangular or a square cross-section to eliminate the air gaps found in motor coils of the prior art wound from round wire. The elimination of air gaps decreases the thermal resistance from inner windings to outer windings of the flat coils. Therefore, the cooling characteristics of the armature 30 are further enhanced over those of the prior art single cold plate armature.

Figure 3B:
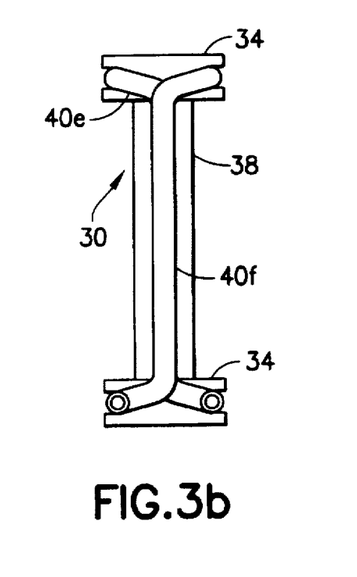
FIG. 3b is an end view of the embodiment of the present invention shown in FIG. 3a showing cross-over connecting tubes.
Figure 3C:
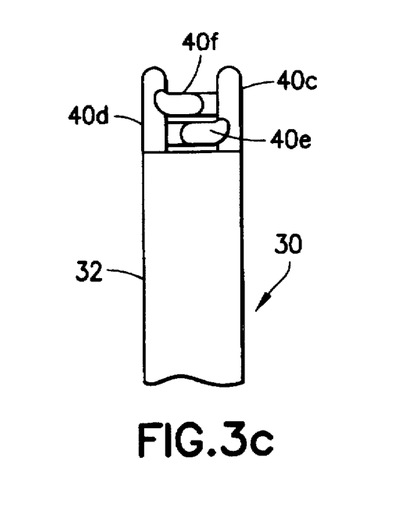
FIG. 3c is a bottom view of the embodiment of the present invention shown in FIG. 3a detailing the cross-over tubes.

Referring to FIGS. 3b and 3c, end and bottom views of the armature assembly 30 show cross-over connecting tubes 40e and 40f. The cross-over connecting tubes, 40e and 40f, connect coolant tube 40b to coolant tube 40c and coolant tube 40a to coolant tube 40d, respectively, at a first end of armature assembly 30. On a second end of the armature assembly a single connecting tube (not shown), similar to either of connecting tubes 40e and 40f, connects coolant tubes 40b and 40a. Flexible tubing supplies coolant to tube 40c which feeds coolant to tube 40b via connecting tube 40e. Coolant runs down tube 40b to the single connecting tube (not shown) which conveys coolant to tube 40a. Coolant runs down tube 40a to connecting tube 40f which conveys coolant to tube 40d. Coolant runs down tube 40d and out through another attached flexible tube. Thus, all tubes are fed serially while the motor is in operation.

Figure 4:
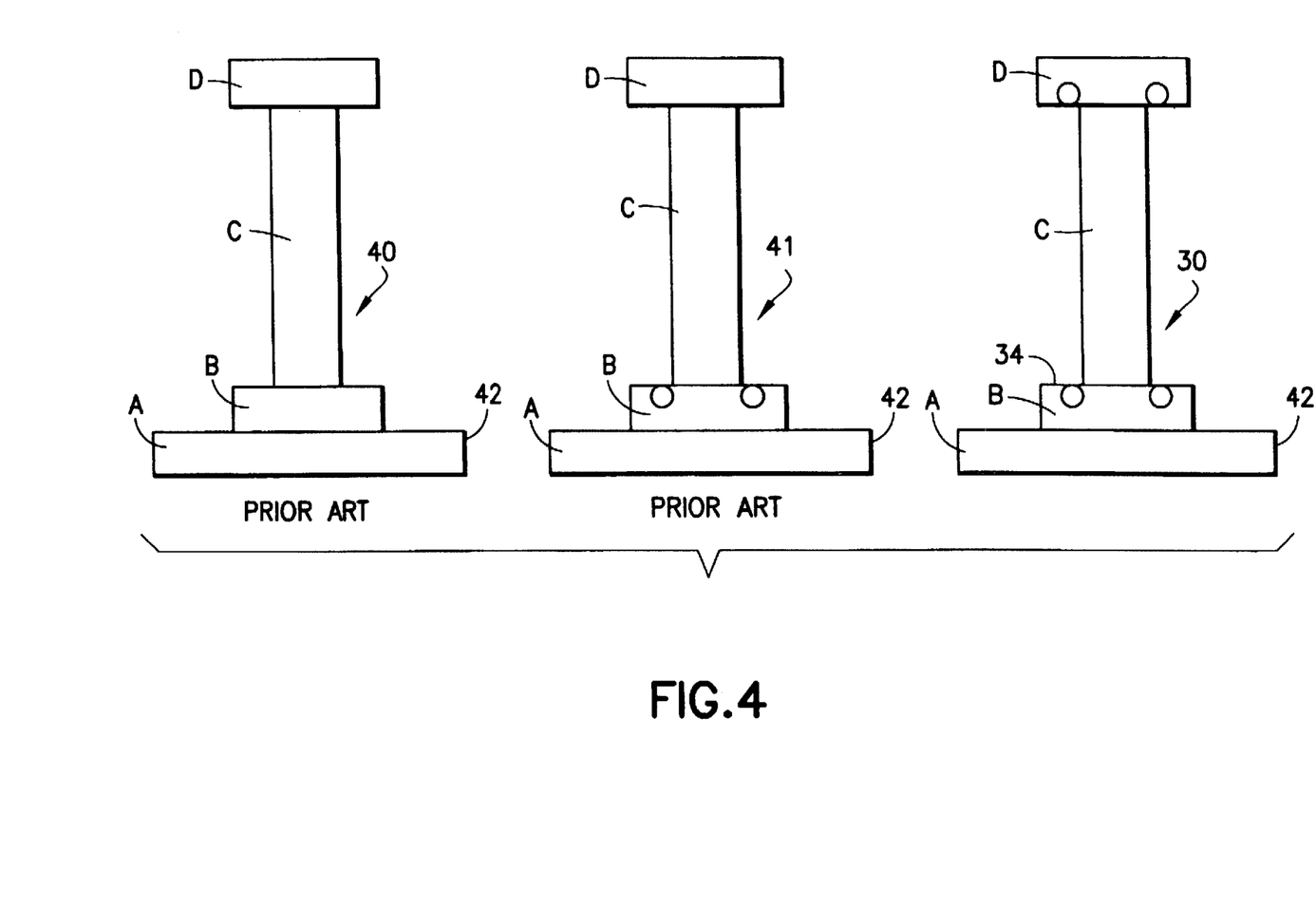
FIG. 4 presents simplified end views of three armatures, two of the prior art and one of the present invention, showing locations of temperature measurements taken on the armatures.

Referring to FIG. 4, end views of the armature assembly 30 and two prior art armature assemblies, 40 and 41, depict the cooling configuration of each assembly. Each armature assembly is mounted upon a mount plate 42. Armature assembly 40 has no liquid cooling, armature assembly 41 has liquid cooling via a base cold plate, and the armature assembly 30 has both base and top cold plate cooling as discussed above. Temperature monitoring locations A, B, C, and D, are indicated on each armature assembly. The maximum rated temperature for the coils of the armature assemblies, 30, 40, and 41, is 120° C.

To evaluate the effectiveness of the cooling configuration of armature assembly 30, power applied to each armature assembly was increased until the rated temperature was reached at some point on the given armature. Table 1 below shows the results of this test. The single cold plate armature 41 was capable of carrying 3 amps and the no-liquid-cooling armature 40 accepted 2.6 amps before each reaching the rated temperature at position D on the assemblies, which is furthest from the mount plate 42. In comparison, the dual cold plate armature assembly 30 handled 4 Amps before the rated temperature was reached at location B at the base cold plate.

A more uniform operating temperature in a given armature assembly is indicative of efficient heat removal and provides for achieving maximum utility from the armature. If a localized area of an armature limits operation due to heating, then maximum utility is not derived from the remainder of the armature which is well within the safe operating temperature region. Thus, the advantage of dual cold plate cooling is demonstrated.

TABLE 1

| LOCATION ARMATURE | A TEMP (C.°) | B TEMP (C.°) | C TEMP (C.°) | D TEMP (C.°) | Max. Current (AMPS) | Power Capacity (WATTS) | Thermal Resistance (C.°/W) |
|---|---|---|---|---|---|---|---|
| 30 (DOUBLE SIDED COOLING) | 39 | 122 | 114 | 102 | 4 | 254 | 0.4 |
| 40 (SINGLE SIDED COOLING) | 38 | | 73 | 120 | 3 | 138 | 0.9 |
| 41 (NO COOLING) | 65 | | 79 | 120 | 2.6 | 94 | 1.3 |

The translation of current capacity into power dissipation capacity provides a further measure of the improvement provided by the cooling configuration of the dual cold plate armature assembly 30. The power capacity of the dual cold plate armature 30 exceeds that of the single cold plate armature 41 by 84%. This represents a significant improvement in the power capacity of a linear motor, allowing for greater forces and acceleration.

Figure 5:
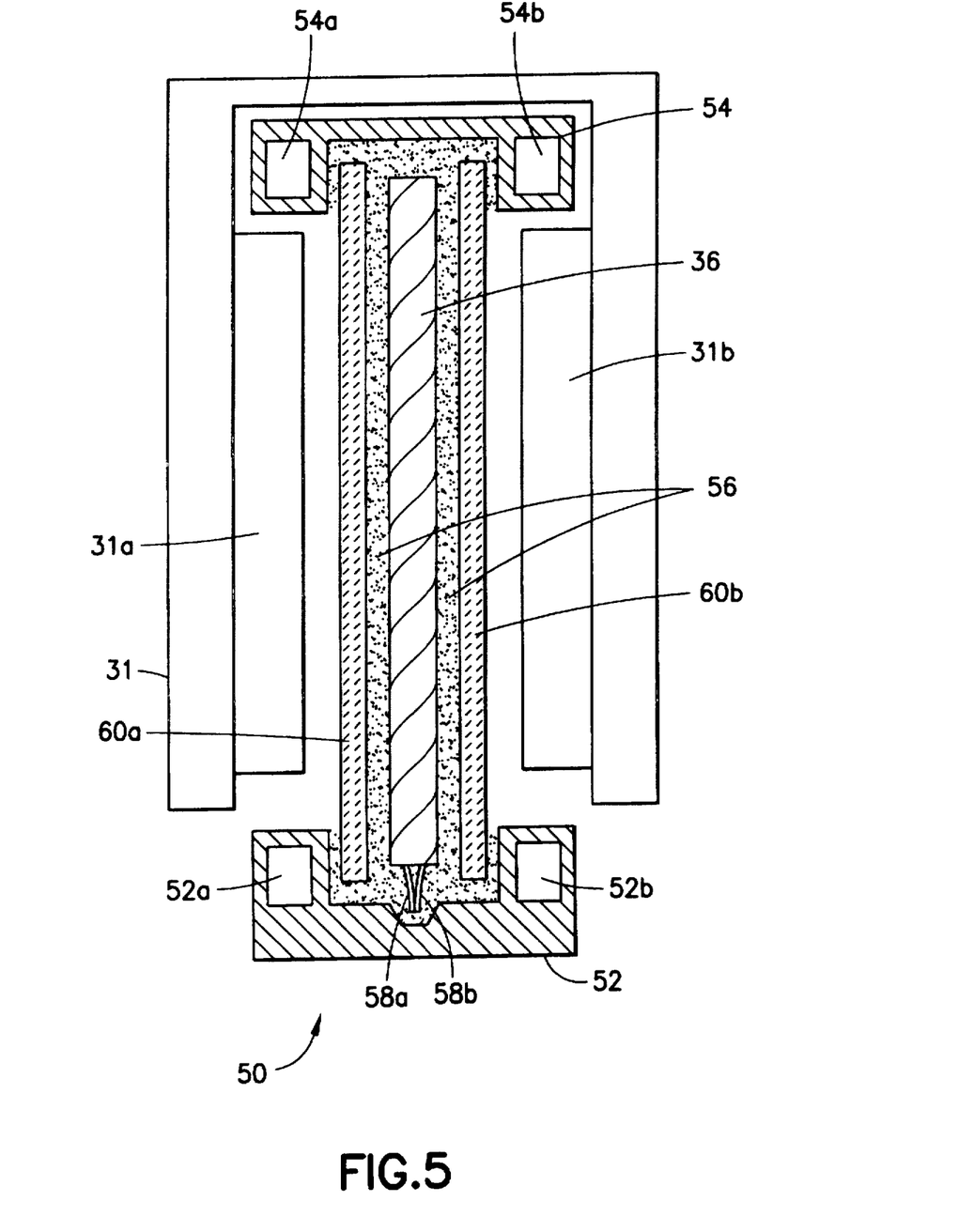
FIG. 5 is a partial cross section end view of another embodiment of an armature of the present invention.

Referring to FIG. 5 a cross-section through another embodiment of the present invention is shown. An armature assembly 50 is similar to the above embodiment except as stated herein. A base cold plate 52 and top cold plate 54 are produced from extrusions with integral passages replacing the coolant tubes 40a, 40b, 40c, and 40d, in the aforementioned embodiment. The base cold plate 52 includes coolant passages 52a and 52b. The top cold plate 54 includes coolant passages 54a and 54b. The coolant passages 52a, 52b, 54a, and 54b, are readily formed in the extrusions by methods familiar to those skilled in the art of extrusion design. Cross-over connections at ends of the coolant passages can be implemented by means realizable by those skilled in the art of manufacture and are not detailed herein. Coil lead wires 58a and 58b connect to a trailing cable (not shown) via wiring or a printed circuit board in the base cold plate 52 or cast into the settable resin.

The use of extrusions in the construction of the cold plates, 52 and 54, saves time used and expenses incurred during manufacture by elimination of the need to bond the coolant tubes 40a, 40b, 40c, and 40d, into the cold plates, 32 and 34, of the aforementioned embodiment. Furthermore, thermal resistance between the cooling liquid and the armature block 38 is reduced because a thermal resistance of a bonded interface between the coolant tubes 40a, 40b, 40c, and 40d, and the cold plates 32 and 34 is eliminated. The lowered thermal resistance produces still further improvements in cooling efficiency.

The extrusions comprising the cold plates, 52 and 54, are formed from aluminum. Aluminum's low thermal resistance and its lightweight make it particularly suitable to this application. However, aluminum is also electrically conductive which permits the production of eddy currents in the cold plates, 52 and 54, which travel through magnetic fields created by the magnets, 31a and 31b, of the U-shaped frame 31. Eddy currents produce drag upon the armature and dissipate energy as heat. Therefore, in applications requiring high speed, electrically non-conductive materials which have high thermal conductivities are preferred. Ceramic materials such as silicon carbide and aluminum nitride satisfy these requirements and are used in embodiments requiring these characteristics. Other such materials may be identified by those skilled in the art and are within the scope and spirit of the present invention.

Settable resin 56 is used to bond the armature assembly 50 together. This settable resin 56, as discussed above, is chosen for its high thermal conductivity. Although the thermal conductivity of the settable resin 56 is high for a resin, it is not as high as thermal conductivities of aluminum or ceramics. For example, resin core motors exhibit a typical thermal conductivity of 1 W/°C.-m while motors employing steel laminations have a typical thermal conductivity of 30 W/°C.-m. In order to improve the thermal conductivity of the armature assembly 50, heat sink plates, 60a and 60b, are bonded on sides of the armature assembly 50. The heat sink plates, 60a and 60b, serve to further decrease the thermal resistance between a middle portion of the armature assembly 50 and the base and top cold plates, 52 and 54, because the heat sink plates, 60a and 60b, have a thermal conductivity superior to that of the settable epoxy resin.

The heat sink plates, 60a and 60b, are formed of electrically non-conductive and non-magnetic but thermally conductive materials such as the aforementioned ceramics. The components are assembled together into the armature assembly 50 using the epoxy resin described in the embodiment shown in FIG. 2. The use of ceramic type materials results in the armature assembly 50 being non-magnetic, and non-conductive with the exception of the coils 36, thereby effectively eliminating eddy currents which cause drag and heating of the armature assemblies while improving the thermal conductivity of the armature assembly 50. While the heat sinks plates, 60a and 60b, are shown functioning in conjunction with the base and top cold plates, 52 and 54, other embodiments of the present invention may employ such heat sink plates functioning with a single cold plate or a heat sink member employing fins or other means to dissipate heat aside from liquid cooling.

Figure 6A:
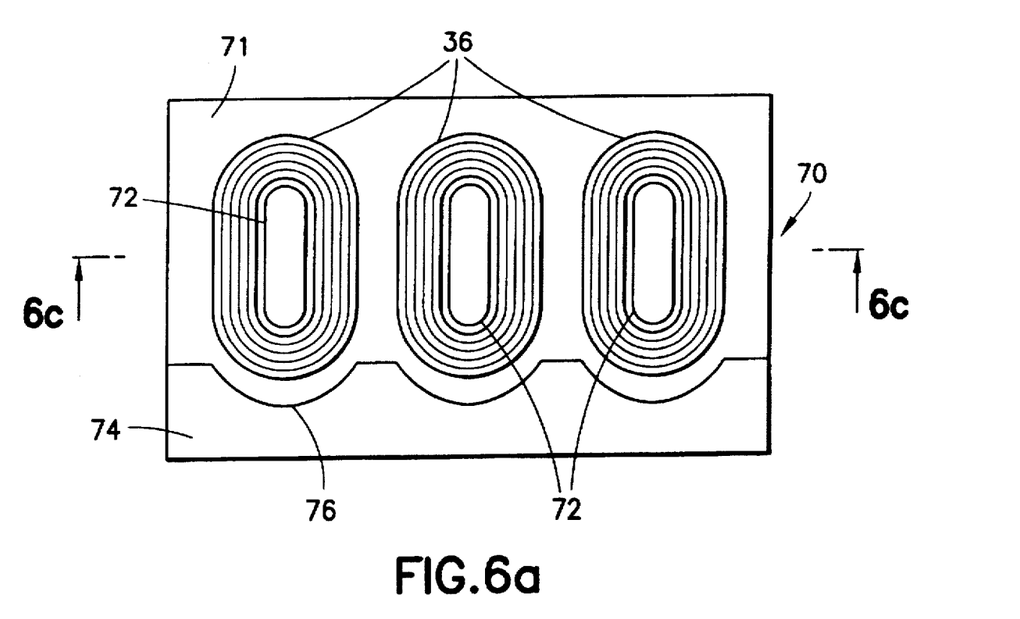
FIG. 6a is a side plan view of yet another embodiment of the present invention having a first ceramic substrate configuration.
Figure 6B:
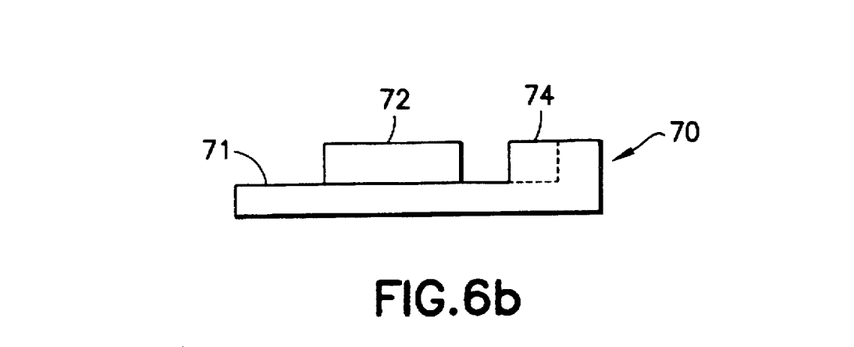
Figure 6C:
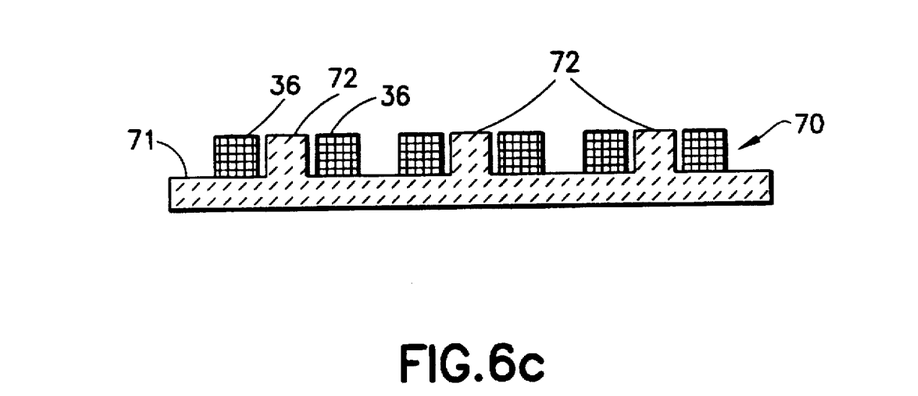

Referring to FIGS. 6a, 6b, and 6c, a further embodiment of the present invention is shown wherein a ceramic substrate 70 has the coils 36 (not shown in FIG. 6b) mounted upon it. The ceramic substrate 70 has a recessed surface 71 from which raised islands 72 extend into openings of the coils 36. A base portion 74 has contours 76 into which lower portions of the coils 36 extend. The ceramic substrate 70 is potted with settable resin and a cold plate (not shown) of one of the above embodiments is affixed to the base portion 74. The islands 72 and contours 76 are dimensioned so as to provide a close fit with the coils 36, minimizing the amount of settable resin between the coil 36 and the ceramic substrate 70 and thus, also minimizing the thermal junction resistance. The islands 72 draw heat away from the center of the coils 36 by providing a low thermal resistance path to the base portion 74 and a cold plate (not shown) attached thereto. The thicker base portion 74 increases the surface area through which heat flows from the ceramic substrate 70 into the cold plate, reducing the thermal resistance of the junction between the cold plate and the ceramic substrate. Once again, the superior thermal conductivity of the ceramic substrate 70 provides for a significant cooling improvement over an armature assembly constructed using only resin encapsulation. Additionally, a ceramic cover plate (not shown) may be affixed over the ceramic substrate 70 thereby further increasing the thermal conductivity to the cold plate. Another embodiment has a second cold plate affixed to the top of the ceramic substrate 70 to further enhance cooling.

Figure 7A:
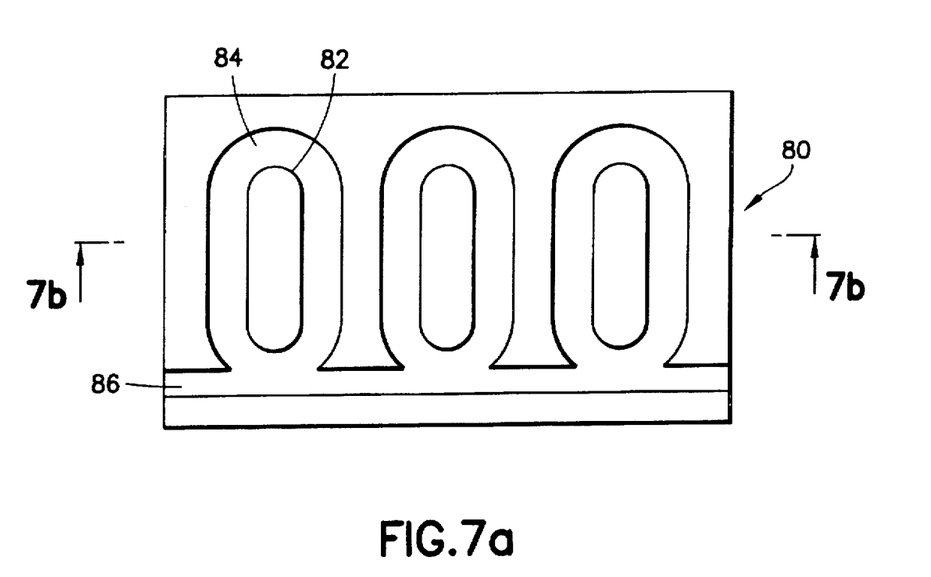
FIG. 7a is a side plan view of still another embodiment of the present invention showing a second ceramic substrate configuration.
Figure 7B:
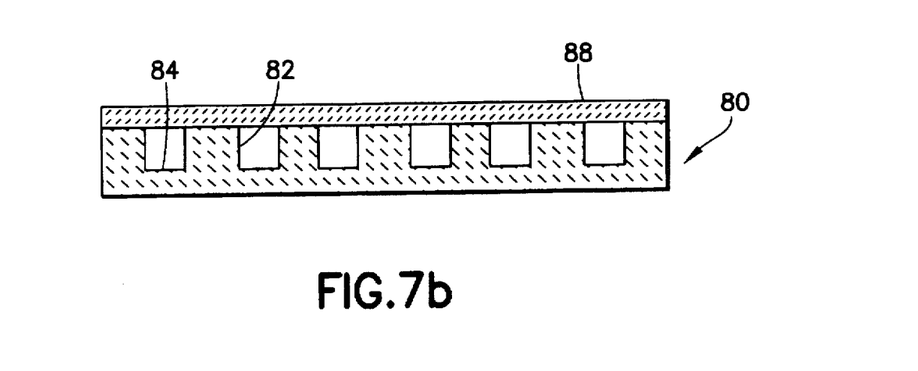

Referring to FIGS. 7a and 7b, another embodiment of the present invention is shown wherein a ceramic substrate 80 has annular recesses 84 forming islands 82. The annular recesses 84 are dimensioned to provide for a close fit with coils (not shown) inserted into the annular recesses 84. A trough 86 is provided to accept coil leads connected to a control cable (not shown). Coils are inserted into the annular recesses and potted therein using high thermal conductivity settable resin. A ceramic cover plate 88, shown in FIG. 7b, is optionally affixed over the ceramic substrate, further improving thermal conductivity of the ceramic substrate assembly. Cold plates (not shown) are affixed to top and base portions of the ceramic substrate assembly in a similar manner as that shown in the above embodiments. The high volumetric content of ceramic material in such an armature assembly serves to provide superior thermal characteristics without the use of electrically conductive or magnetic materials which produce eddy current drag and losses.

Figure 8:
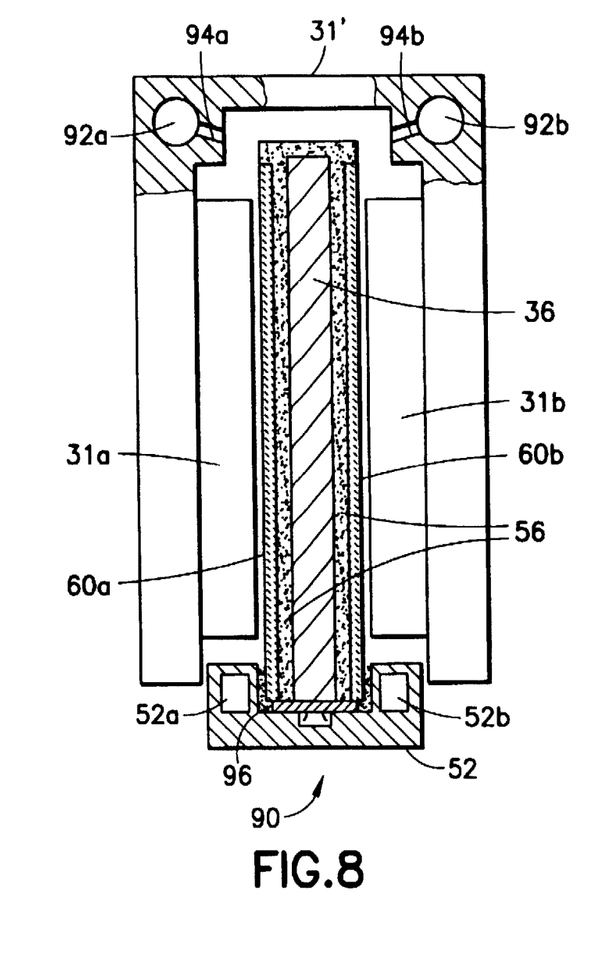
FIG. 8 is a partial cross section end view of a further embodiment of the present invention having ducted air and cold plate cooling.

Referring to FIG. 8 another embodiment of the present invention is shown including air cooling. An armature assembly 90 is similar to the armature assembly 50 of FIG. 5 except as provided herein. The armature assembly 90 is provided with a single cold plate, the base cold plate 52. The use of the base cold plate 52 alone allows the armature assembly 90 to be extracted in a downward vertical direction anywhere along U-frame 31'. Although base cold plate 52 is shown composed of an extrusion, it is realized that a cold plate of proper size using other construction techniques may be employed.

The U-frame 31' includes air passages, 92a and 92b, which provide a flow of cooling air via orifices, 94a and 94b, to a space surrounding a top of armature assembly 90. The flow of cooling air removes heat from the top portion of the armature assembly 90 which is furthest from the base cold plate 52. This provides for more uniform cooling than is achieved if only the base cold plate 52 was employed. Therefore, the armature assembly may operate at higher power levels than similar non-magnetic armatures of the prior art.

The base cold plate 52 further includes a printed circuit board 96 into which leads from the coils 36 connect. A trailing cable (not shown) is then connected to the printed circuit board. Other means of wiring, including harnesses and flexible printed circuits connected to the trailing cable and coil leads, may be incorporated into the base cold plate 52 or cast in the resin encapsulation. Such methods are included within the scope and spirit of the present invention.

Figure 9:
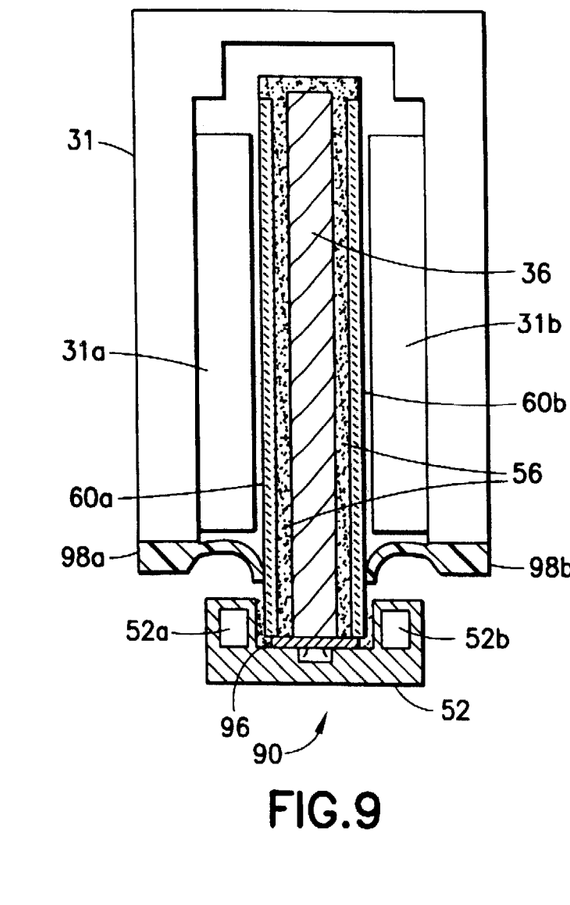
FIG. 9 is a partial cross section end view of a still further embodiment of the present invention having air cooling and cold plate cooling.

Referring to FIG. 9, still another embodiment of the present invention employing air cooling is shown. The armature assembly 90 travels in the U-frame 31. The U-frame 31 includes seals, 98a and 98b, mounted along lower edges of the U-frame 31. The seals, 98a and 98b, are formed of a flexible plastic or rubber material and extend along the entire length of the U-frame 31. Along portions of the U-frame where the armature assembly 90 is not present, the seals, 98a and 98b, engage each other preventing the escape of air from the U-frame. A flow of cooling air is introduced into a first end of the U-frame 31 and exits by a second end of the U-frame 31. Adapters (not shown) on the first and second ends of the U-frame 31 interface with means of supplying cooled air and are readily realizable by those skilled in the art. The cooling air passes over the armature assembly 90 thereby cooling it. The seals, 98a and 98b, are pushed apart by longitudinal movement of the armature assembly 90 in the U-frame 31. Due to a larger area for passage, a greater flux of flowing air exists around the top portion of the armature assembly 31 which is otherwise subject to heat buildup since it is furthest from the cold plate 52. Thus, uniform cooling of the armature assembly 90 is effected by the combination of the base cold plate 52 and the cooling air flow at the top portion of the armature assembly 31.

The embodiment of FIG. 9 allows the armature assembly to be removed from the U-frame 31 at any location along its length since there is no cold plate on the top portion of the armature assembly 90 to prevent its removal. Furthermore, the seals, 98a and 98b, serve to prevent debris from entering the U-frame and interfering with operation of the linear motor. Similarly, seals may be incorporated into the embodiment presented in FIG. 8. Additionally, vertical cooling fins may be added to the top portion of the armature assembly 90 to further enhance the cooling effect of the flowing air.

Figure 10:
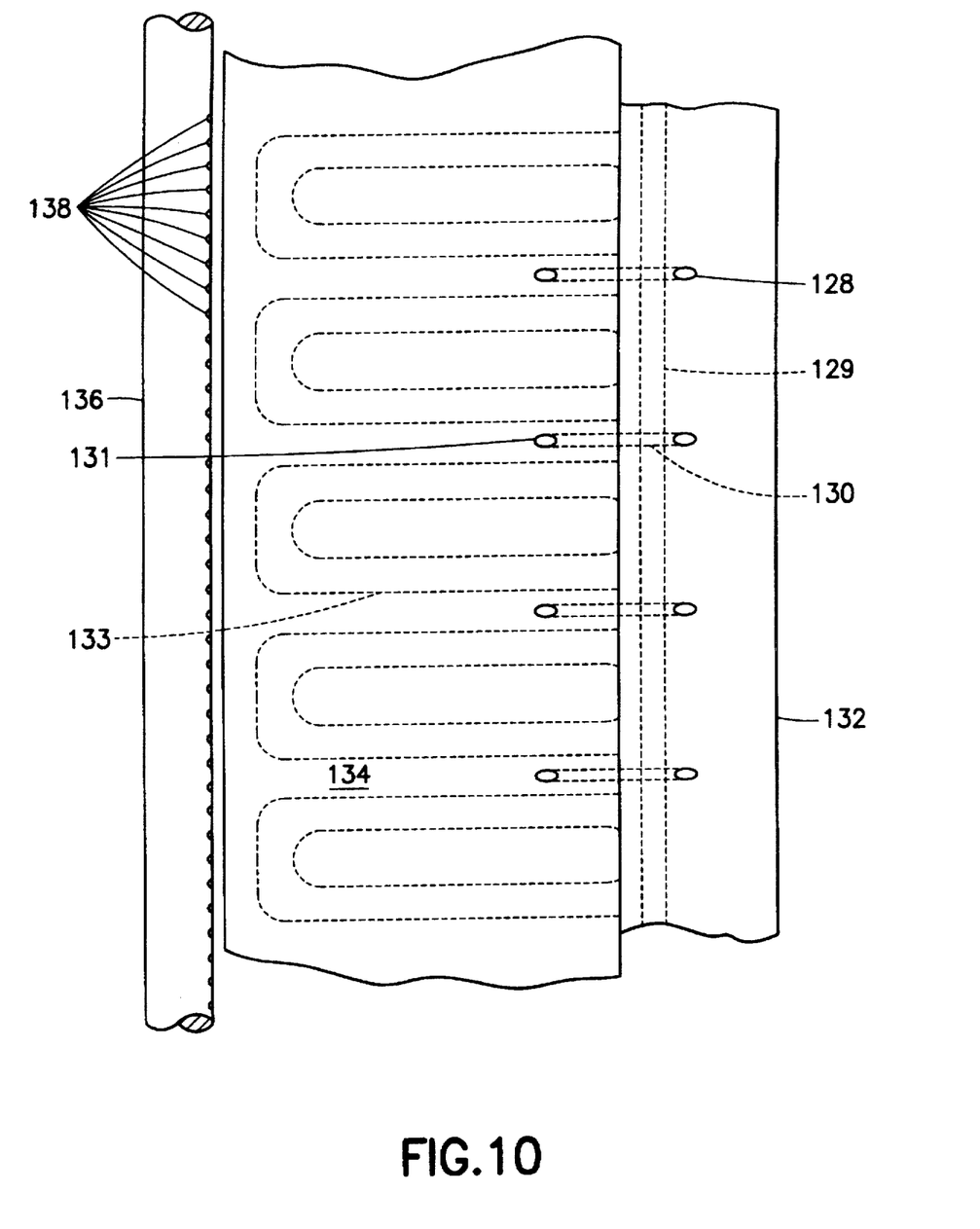
FIGS. 10 and 11 are partial section views of another embodiment of the invention.
Figure 11:
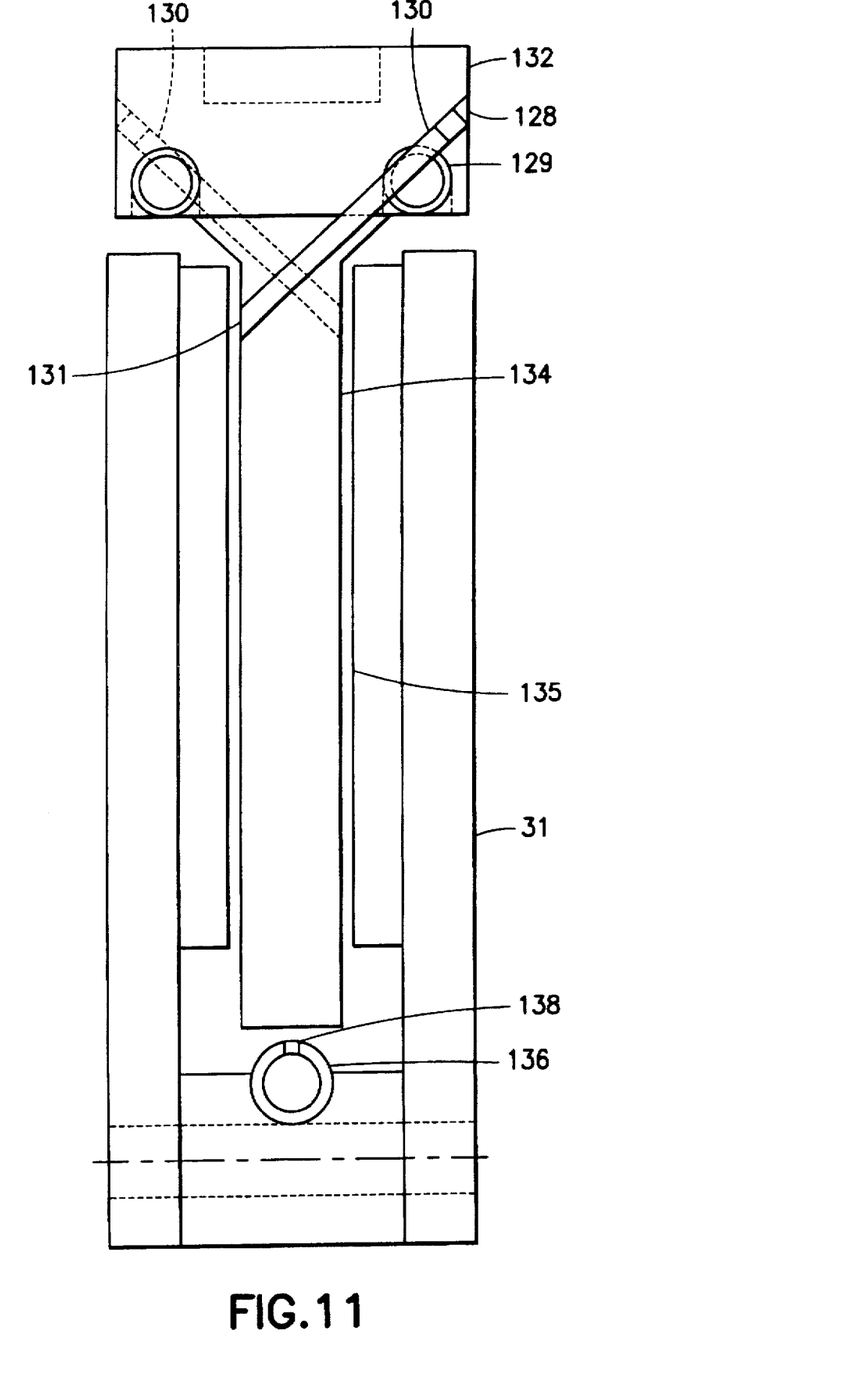

Referring to FIGS. 10 and 11, a base element 132 is provided with an air passage 129. Minor channels 130 are drilled through base element 132 to connect major channel 129 to a space 135 between armature block 134 and U-frame 31. The design of the embodiment of FIGS. 10 and 11 allows easy manufacture by drilling out minor channels 130. Entry and exit of a drill tool can be accomodated easily as can be seen by noting the positions of entry hole 128 and exit hole 131. Entry hole 128 is plugged to seal the air passages so that all the air is injected into space 135. The course followed by cooling air is as follows: Air is distributed through air passage 129 to all of the minor channels 130. Minor channels 130 inject air into space 135. Air flows through the space and is drawn out through apertures 138 into exit channel 136. Apertures 138 are distributed along the length of U-frame 31. Ideally apertures are located between exit holes 131 so air must flow diagonally across the armature. In addition, a large number of small apertures can be used to improve distribution of flow across the surface of armature plate 134. Note that air could be distributed and taken up in the opposite direction as well. That is air could be conveyed into the space between U-frame 31 and armature plate 134 and then out through exit holes 131 and duct 129.

Although according to the above embodiments, the upper and lower cooing tubes are connected in series, it is apparent from the present disclosure that each pair of tubes could be fed in parallel. In that case, since heat transfer fluid would be carried in parallel in twice as many tubes for a given section of armature block, the volume of fluid is increase over that of the prior art without increasing the tubing diameter. This would result in lower temperature rise of the heat transfer fluid and further increasing the rate of heat transfer and the attendant power dissipation capacity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A linear motor comprising:
   a magnet plate having a plurality of magnets of alternating polarity affixed thereto;
   an armature block having at least one coil encapsulated in a settable resin;
   said armature block containing substantially no magnetic material;
   a first cold plate affixed to a bottom portion of said armature block;
   a second cold plate affixed to a top portion of said armature block;
   said armature block having a ceramic heat sink plate affixed upon a side thereof;
   said ceramic heat sink plate extending to make thermal contact with each of said first and second cold plates such that heat is effectively removed from a middle portion of said armature block; and
   means for allowing supply of a cooling liquid to said first and said second cold plates such that heat dissipated by said at least one coil in said armature block is removed by said cooling liquid.

2. A linear motor according to claim 1 wherein said first and second cold plates each include a member having a slot into which said top and bottom portions of said armature block are affixed, respectively, and tubing incorporated substantially throughout perimeters of said first and second cold plates.

3. A linear motor according to claim 1 wherein:
   said first and second cold plates each include an extrusion member having a slot into which said top and bottom portions of said armature block are affixed, respectively, and integral passages, parallel to said slot, for carrying cooling liquid; and passage connecting means for interconnecting said integral passages so as to provide a complete fluid circuit, in each of said first and second cold plates, from a cooling fluid input to a cooling fluid output thereof.

4. A linear motor according to claim 3 wherein said extrusion members are formed from non-magnetic and non-electrically conductive materials such as ceramics including one of silicon carbide and aluminum nitride.

5. A linear motor according to claim 1 wherein said at least one coil is a flat coil having windings formed from wire having a rectangular cross section.

6. A linear motor as in claim 1, wherein said first and second cold plates are of material with a higher thermal conductivity than a thermal conductivity of encapsulating material of said armature block.

7. A linear motor comprising:
  a magnet plate having a plurality of magnets of alternating polarity affixed thereto;
  an armature block having at least one coil and a ceramic substrate heat sink;
  said at least one coil having a center aperture;
  said ceramic substrate heat sink having a plate surface and a protrusion extending from said plate surface and into said center aperture of said at least one coil positioned upon said plate surface;
  said at least one coil and said ceramic substrate heat sink being encapsulated in a settable resin;
  said armature block containing substantially no magnetic material;
  heat sink means for sinking heat carried by said ceramic substrate heat sink from said at least one coil;
  said heat sink means includes a cold plate affixed to a lower portion of said armature block; and
  said heat sink means includes means for allowing supply of a cooling liquid to said cold plate such that heat dissipated by said at least one coil in said armature block is removed by said cooling liquid.

8. A linear motor according to claim 7, further comprising:
  a magnet plate having a plurality of magnets of alternating polarity affixed thereto;
  an armature block having at least one coil and a ceramic substrate heat sink;
  said heat sink means including a second cold plate;
  said second cold plate being affixed to an upper portion of said armature block; and
  said heat sink means including means for allowing supply of a cooling liquid to said second cold plate such that heat dissipated by said at least one coil in said armature block is removed by said cooling liquid.

9. A linear motor according to claim 8 wherein
  said ceramic substrate heat sink includes a base portion and a top portion;
  said base portion is affixed in said first cold plate and said top portion is affixed in said second cold plate; and
  said base portion and said top portion have a thickness greater than said ceramic substrate heat sink at said plate surface so as to decrease a thermal junction resistance between said base and top portions and said first and second cold plates, respectively.

10. A linear motor according to claim 7 further comprising said armature block including a ceramic cover plate such that said at least one coil is interposed between said ceramic cover plate and said ceramic substrate heat sink.

11. A linear motor, comprising:
  a magnet plate having a plurality of magnets of alternating polarity affixed thereto;
  an armature block having at least one coil and a ceramic substrate heat sink;
  said at least one coil having a center aperture;
  said ceramic substrate heat sink having a plate surface and a protrusion extending from said plate surface and into said center aperture of said at least one coil positioned upon said plate surface;
  said at least one coil and said ceramic substrate heat sink being encapsulated in a settable resin;
  said armature block containing substantially no magnetic material;
  heat sink means for sinking heat carried by said ceramic substrate heat sink from said at least one coil;
  said heat sink means includes a cold plate affixed to a lower portion of said armature block; and
  said heat sink means includes means for allowing supply of a cooling liquid to said cold plate such that heat dissipated by said at least one coil in said armature block is removed by said cooling liquid;
  said ceramic substrate heat sink includes a base portion;
  said base portion is affixed in said cold plate; and
  said base portion has a thickness greater than said ceramic substrate heat sink at said plate surface so as to decrease a thermal junction resistance between said base portion and said cold plate.

12. A linear motor comprising:
  a magnet plate having a plurality of magnets of alternating polarity affixed thereto;
  an armature block having at least one coil and a ceramic substrate heat sink;
  said ceramic substrate heat sink being located on a side of said armature block;
  said ceramic substrate heat sink having a recess for accepting said at least one coil;
  said at least one coil and said ceramic substrate heat sink being encapsulated in a settable resin;
  said armature block containing substantially no magnetic material;
  heat sink means for sinking heat carried by said ceramic substrate heat sink from said at least one coil; and
  said ceramic substrate heat sink contacting at least a portion of said heat sink means, whereby heat is effectively removed from a middle portion of said armature block.

13. A linear motor according to claim 12 further comprising:
  said at least one coil having a center aperture; and
  said recess having a bottom surface and a protrusion extending from said bottom surface and into said center aperture of said at least one coil positioned upon said plate surface.

14. A linear motor according to claim 12 wherein:
  said heat sink means includes a cold plate affixed to a lower portion of said armature block; and
  said heat sink means includes means for allowing supply of a cooling liquid to said cold plate such that heat dissipated by said at least one coil in said armature block is removed by said cooling liquid.

15. A linear motor according to claim 12 wherein:

said heat sink means includes a first and a second cold plate;

said first cold plate is affixed to a lower portion of said armature block;

said second cold plate is affixed to an upper portion of said armature block; and said heat sink means includes means for allowing supply of a cooling liquid to said first and said second cold plates such that heat dissipated by said at least one coil in said armature block is removed by said cooling liquid.

16. A linear motor according to claim 15 further comprising:

said at least one coil having a center aperture; and said recess having a bottom surface and a protrusion extending from said bottom surface and into said center aperture of said at least one coil positioned upon said plate surface.

17. A linear motor comprising:

a U-frame having opposing inner walls, joined by a bridge portion at a closed end, defining a longitudinal cavity;

said opposing inner walls having a plurality of magnets of alternating polarity affixed thereto;

an armature block having at least one coil encapsulated in a settable resin and traveling within said U-frame;

said armature block containing substantially no magnetic material;

said U-frame having a duct extending throughout a longitudinal length thereof;

said duct having orifices connecting said duct with said longitudinal cavity;

said duct and said orifices permitting cooling air to be introduced into said longitudinal cavity such that heat generated in said armature block is removed by said cooling air;

a cold plate affixed to a bottom portion of said armature block;

a ceramic heat sink plate affixed to a side of said armature block and in thermal contact with said cold plate, such that heat is effectively removed from a middle portion of said armature block;

means for allowing supply of a cooling liquid to said cold plate such that heat dissipated by said at least one coil in said armature block is removed by said cooling liquid; and said orifices directing a flow of cooling air at a top portion of said armature block furthest from said first cold plate.

18. A linear motor according to claim 17 further comprising:

said armature block having a ceramic heat sink plate affixed upon a side thereof.

said ceramic heat sink plate extending to make thermal contact with said cold plate such that heat is effectively removed from a middle portion of said armature block.

19. A linear motor according to claim 17 further comprising:

said armature block having a ceramic substrate heat sink;

said at least one coil having a center aperture; and said ceramic substrate heat sink having a plate surface and a protrusion extending from said plate surface into said center aperture of said at least one coil positioned upon said plate surface.

20. A linear motor according to claim 17 further comprising:

an armature block having a ceramic substrate heat sink;

said ceramic substrate heat sink having a recess for accepting said at least one coil;

said cold plate sinking heat carried by said ceramic substrate heat sink from said at least one coil.

21. A method of making a linear motor, comprising the steps of:

positioning a frame with permanent magnets adjacent an armature element having electrical coils and a duct in such a way as to form a space between said frame and said armature element;

forming a passage in said armature passing from one surface of said armature not adjacent said space through said duct and into said space thereby forming a passage opening to said space at a first opening of said passage and opening through said one surface not adjacent said space at a second opening of said passage;

sealing said second opening so that said duct communicates with said space without leaking through said second opening;

injecting air into said space through said duct, through said passage and out through said first opening.

* * * * *